(12) United States Patent
Morales

(10) Patent No.: US 10,702,080 B2
(45) Date of Patent: Jul. 7, 2020

(54) SYSTEM OF SUPPORT AND INSERTS FOR BUFFET STATION WELLS

(71) Applicant: Hector Delgado Morales, Xalatlaco (MX)

(72) Inventor: Hector Delgado Morales, Xalatlaco (MX)

(*) Notice: Subject to any disclaimer, the term of this patent is extended or adjusted under 35 U.S.C. 154(b) by 35 days.

(21) Appl. No.: 16/011,072

(22) Filed: Jun. 18, 2018

(65) Prior Publication Data
US 2019/0021523 A1  Jan. 24, 2019

(30) Foreign Application Priority Data
Jul. 24, 2017 (MX) .................. MX/a/2017/009579

(51) Int. Cl.
*A47J 36/24* (2006.01)
*A47F 10/06* (2006.01)

(52) U.S. Cl.
CPC .......... *A47F 10/06* (2013.01); *A47J 36/2405* (2013.01)

(58) Field of Classification Search
CPC .............................. A47J 36/2405; A47F 10/06
USPC ............................................. 220/23.4, 23.88
See application file for complete search history.

(56) References Cited

U.S. PATENT DOCUMENTS 6,629,620 B1  10/2003  Freeman
7,997,438 B2   8/2011  Kelly

*Primary Examiner* — Stephen J Castellano
(74) *Attorney, Agent, or Firm* — Westman, Champlin & Koehler, P.A.; Z. Peter Sawicki; Amanda M. Prose

(57) ABSTRACT

The present invention relates to a system of support and inserts for an equipment of the type of a buffet station, in which the supporting elements have a design that allows their combination to accommodate a set of inserts in a wide variety of configurations inside a well of a conventional buffet equipment, which allows the same equipment to be adapted according to different food presentation requirements. The elements that constitute the system of support and inserts for an equipment of the type of a buffet station of the invention, are: a) a set of main and intermediate supporting rods that provide support and prevent the sliding of the inserts, and b) a set of inserts of various dimensions that can be configured to cover the entire well; these inserts have a tab designed to be coupled to the supporting bars and avoid displacements perpendicular to the bar.

4 Claims, 9 Drawing Sheets

SYSTEM OF SUPPORT AND INSERTS FOR BUFFET STATION WELLS

TECHNICAL FIELD OF INVENTION

This invention refers to the equipment used in banquets or catering services, in which the food is presented in a set of trays immersed in a heating or cooling medium, as required, confined in a container or well in a particular arrangement, called "buffet stations". This invention specifically refers to one of these equipment in which a novel system to support the trays is used allowing to modify the configuration of quantity and placement of the trays for the maximum use of the space available in the well.

BACKGROUND OF THE INVENTION

A buffet, bufet or bufé is a modality to offer food. In a buffet, the guest finds the food ready to be consumed on a large table. In this way, guests serve themselves what they want in the quantity of their choice. The buffet concept is used not only to name this way of presenting food, but also to designate the tables where food is made available and the facilities that, in some places, allow people to eat meals on the go.

A very simple equipment under construction but illustrating the purpose of these buffet stations is described in U.S. Pat. No. 6,629,620 (Freeman, 2003), which refers to an food service equipment ideal for storing and protecting a variety of prepared foods using efficient and manageable containers to allow and easy and efficient food transfer; a modality of the equipment includes a container, a closing lid, specialized containers and support members. The container can be internally lined with a watertight material such as plastic or galvanized metal; the support members can be removable and covered with a non-corrosive material. Food containers can have various shapes and be made of different materials according to the temperature at which food is intended to be kept, and they are not a part of the equipment; therefore, any container can be used, provided that it allows the lid to close. Before using these containers in the equipment; they can be stored in a refrigerator or a conventional oven in case of cold or hot food, respectively. The equipment does not include supporting elements that allow keeping food containers fixed inside the equipment, and therefore, they could move during use.

As for U.S. Pat. No. 7,997,438 (Kelly, 2011), it describes a buffet server with removable internal dividers and insertable-removable food containers allowing the partition of the interior into one or up to six compartments. Evidently, the shape of the food containers is limited to conform to that of the container.

In the market, some brands are recognized for the quality and variety of their equipment. Among them, Bonchef® (http://www.bonchef.com) and Bugambilia® (http://www-.bugambilia.net) offer stations that can be ordered as complete design through a system of support plates (tiles) and inserts in the shape and size of the cavities of the plate (tile). Its main disadvantage is being a "rigid" system where the only pieces that can be inserted are those matching the cavities of the plate, which prevents reconfiguring the order and size of the inserts, being the depth the only modifiable feature because the inserts are hanging inside the well.

A second option of Bonchef® is a system of supports and inserts to create your own customized configuration, and for this purpose it provides a system of profiles supporting the inserts (food containers). A disadvantage of the design of this system of support and inserts is that the contact surface between the profile and the insert is smooth, and therefore, the insert could fall into the well in case the support profile moves when the station is being used.

A second option of Bugambilia® is a supporting system for the inserts, in which a perforated table is inserted into the well, which serves as a base for the inserts. Its inconvenience is that all the inserts used must have the same depth to maintain the same upper height, and each table must be manufactured according to the dimensions and depth of each well.

OBJECTS OF THE INVENTION

In view of the problems involved in commercially available equipment, an object of the present invention is providing a system of support and inserts for equipment of the type of a buffet station, versatile enough to allow modifying the arrangement of the inserts in a specific well to conform to the requirements of each event in which the equipment is used.

Another object of this invention is to provide a system of support and inserts for equipment of the type of a buffet station, including means preventing the inserts from falling into the well due to movements during use.

It is another object of the present invention to provide a system of support and inserts for an equipment of the type of a buffet station, including a variety of dimensions of inserts, to allow containing different quantities of food.

It is still another object of the present invention to provide a system of support and inserts for an equipment team of the type of a buffet station, where the system of support allows the use of inserts of various dimensions, according to the requirements of each event.

These and other objects will be evident upon considering the following description and accompanying figures, which are not intended to limit the invention, but they are used to illustrate the possibilities thereof.

SUMMARY OF THE INVENTION

The present invention relates to a system of support and inserts for an equipment of the type of a buffet station, in which the supporting elements have a design that allows their combination to accommodate a set of inserts in a wide variety of configurations, which allows the same equipment to be adapted to different requirements of food presentation. The invention system has the flexibility to allow arrangements of inserts of different sizes and depths according to the service needs without using a supporting table inside the well and without the risk of the inserts sliding on the supporting profiles and their fall into the well.

The elements that constitute the system of support and inserts for an equipment of the type of a buffet station of the invention are as follows:

Supporting elements. A set of extruded or molded bars that provide support and prevent the sliding of the inserts, being of two types:
Main supporting elements,
Intermediate supporting elements,
Inserts. A set of trays, trays, food containers, etc., of various dimensions that can be configured to cover the entire well; these inserts have an tab designed to be coupled to the supporting bars and avoid displacements perpendicular to the bar.

DETAILED DESCRIPTION OF THE INVENTION

The present invention relates to a system of support and inserts for an equipment of the type of a buffet station, which allows establishing a wide variety of configurations of the inserts in the same well of a conventional buffet station, adaptable to different requirements for presentation of food, either hot or cold.

Figure 1:
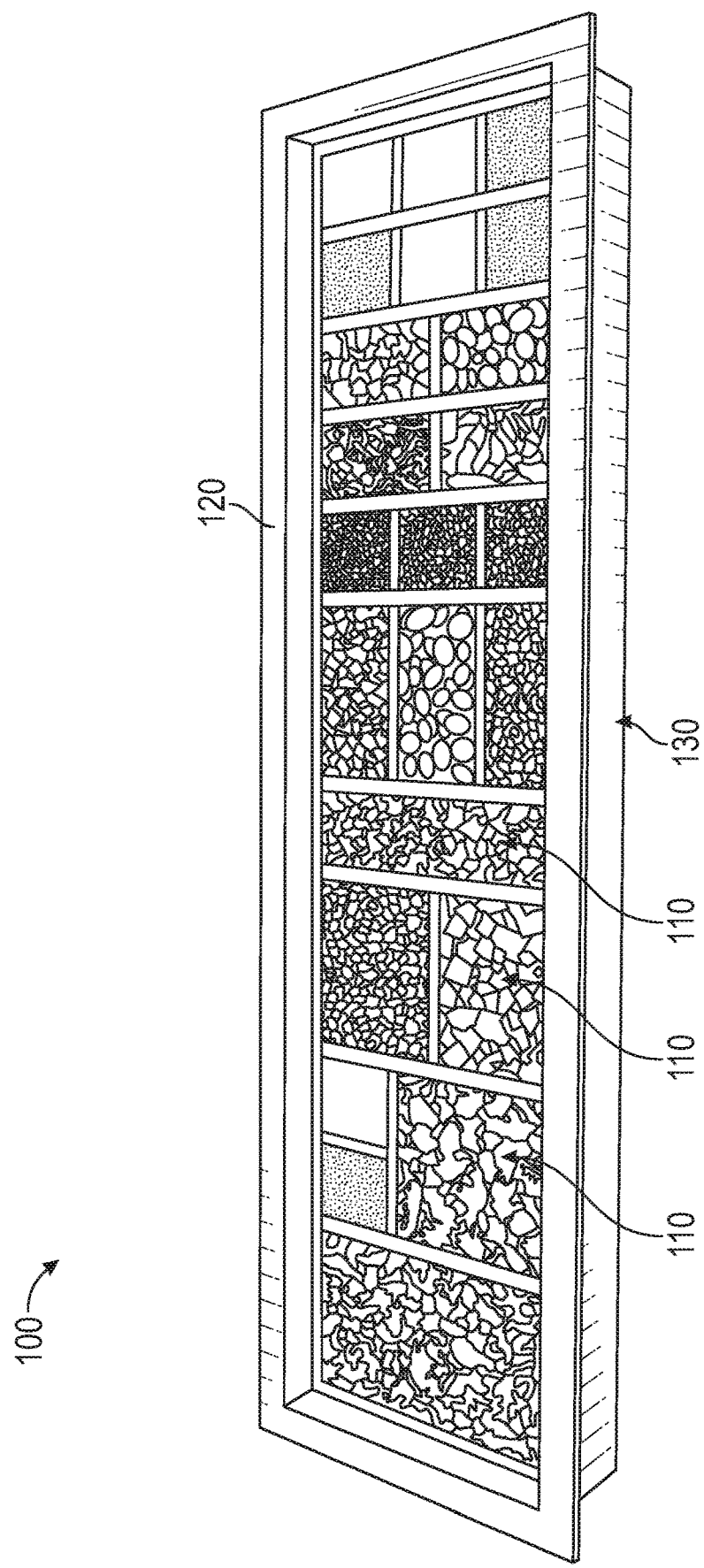
FIG. 1 shows a simple perspective view of an equipment for the presentation of a conventional buffet.

FIG. 1 schematically illustrates a conventional buffet station (100) (the lower body is not shown), where the distribution of the set of inserts (110) (also referred to as trays, food containers, etc.) can be observed in the shape of parallelepipeds with different dimensions, supported on the upper inner flange (120) of the well (130) and occupying the space available.

The way in which the inserts (110) are held in place in the well (130) of most conventional buffet stations, is using a smooth bar whose ends are supported on the flange (120) of the well (130) for the inserts (110) to "hang" on this bar downwards inside the well (130), that contains heating/cooling medium for the food in the inserts (110). Traditionally, this bar offers a smooth top surface that determines the perimeter of each insert (110), which in turn, has a flange projecting peripherally outwards along its upper edge, so that this flange sits on the smooth surface provided by the bar.

Since the supporting elements that make up said bar are arranged on the flange of the well and held in place by gravity (weight of the same-self bars and inserts), they could be moved to either side of the well due to the pressure exercised by a user on the walls and bottom of the inserts when trying to serve food thereby producing, in the worst case, the fall of the insert into the well with the consequent loss of food, and the displacement of others adjacent inserts.

The present invention aims to prevent the movement of the inserts and optimize the use of the space available in the well of a conventional buffet station.

The invention includes two groups of elements: (a) supporting elements, and (b) inserts, which have been designed to overcome the inconveniences of the conventional systems available.

1. Supporting Elements

Figure 2:
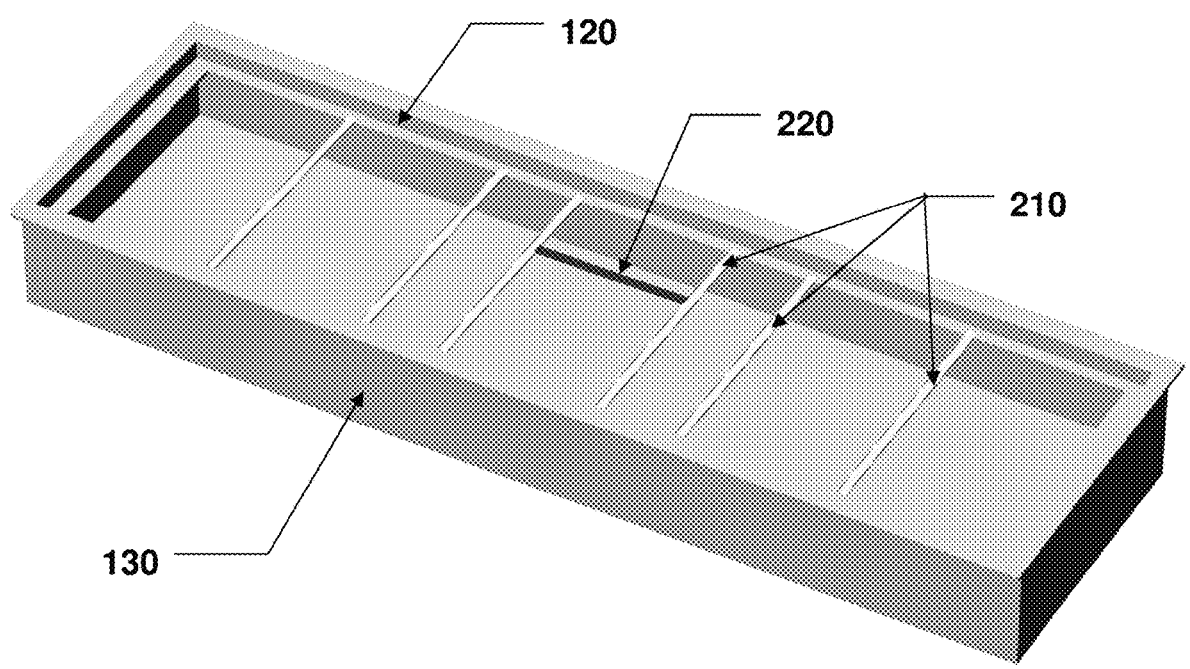
FIG. 2 shows a simple perspective schematic view of a conventional well, with the supporting elements of the system of inserts of the invention.

The supporting elements, as shown in FIG. 2, are a set of bars manufactured with conventional materials, sufficiently strong and rigid to support the combined weight of the inserts and food inside; for instance, aluminum, stainless steel or some plastics, and fibers providing support and preventing the sliding of inserts.

Figure 3:
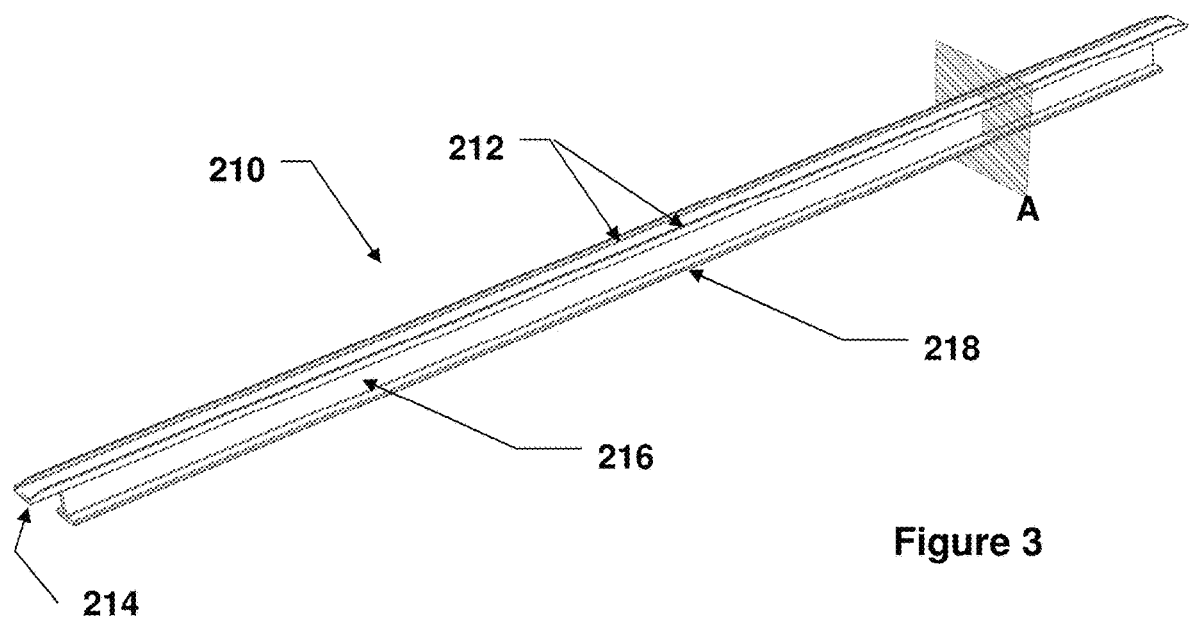
FIG. 3 shows a simple perspective schematic view of a first fixed supporting element of the system of inserts of the invention.
Figure 4A:
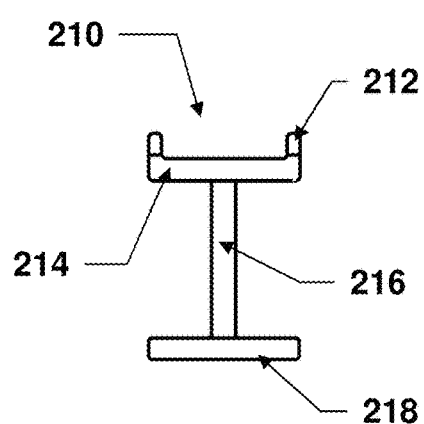
FIG. 4A shows a front view of the profile of the supporting element of FIG. 3.
Figure 4B:
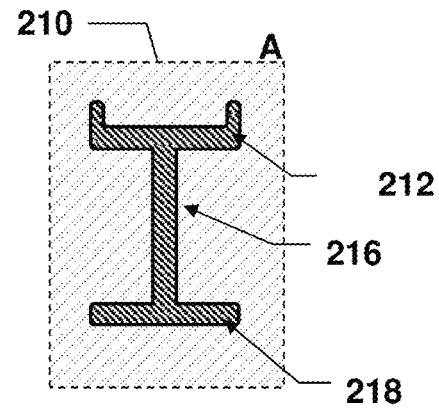
FIG. 4B shows a sectional view the supporting element profile of FIG. 3, through the cutting plane "A".
Figure 5:
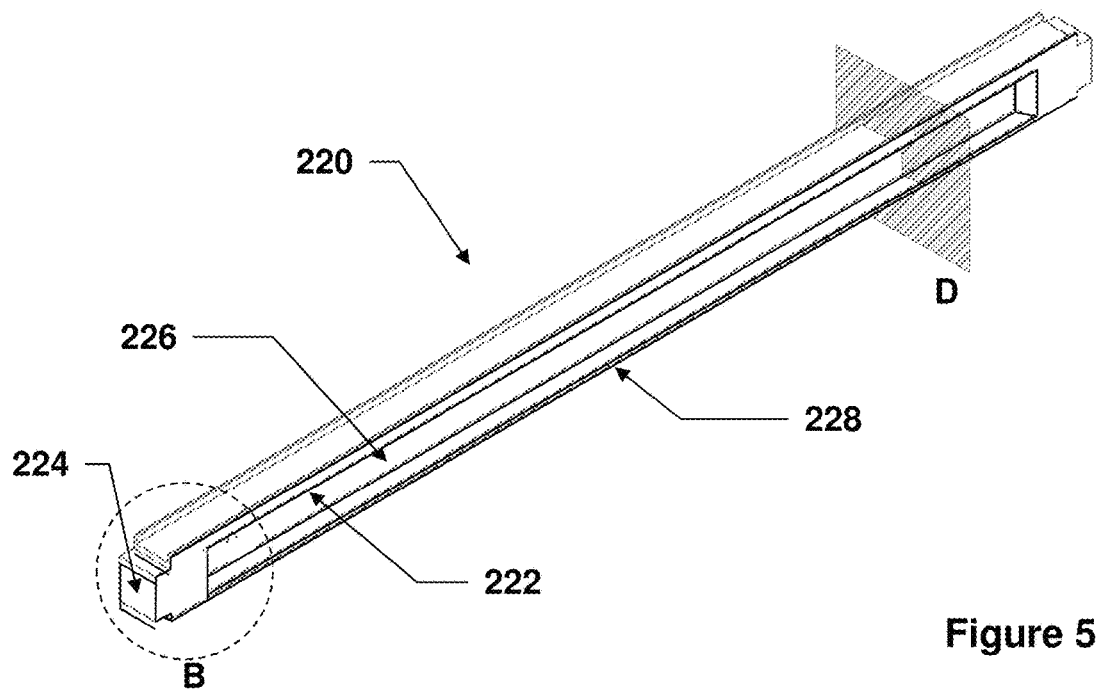
FIG. 5 shows a simple perspective schematic view of a second intermediate supporting element of the system of inserts of the invention.
Figure 6A:
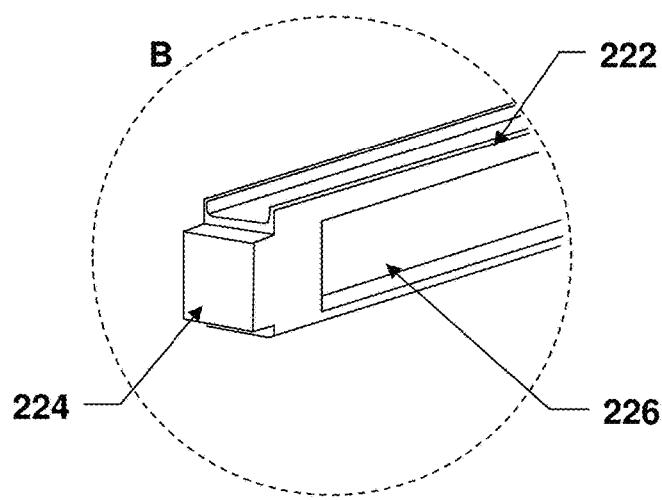
FIG. 6A shows a front detail view "B" of the intermediate supporting element profile of FIG. 4A-4B.
Figure 6B:
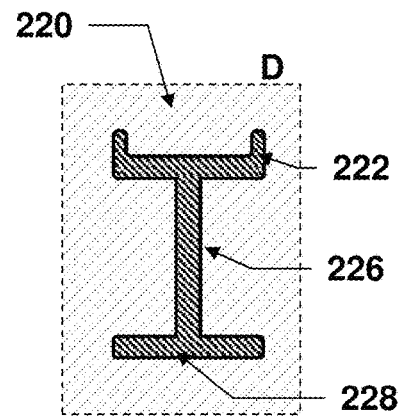
FIG. 6B shows a sectional view of the intermediate supporting element profile of FIG. 4A-4B, through the cutting plane "C".
Figure 9:
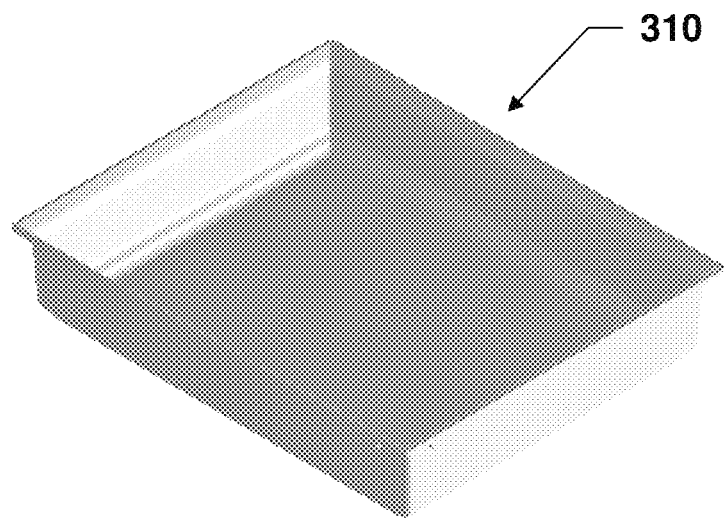
FIG. 9 shows a perspective view of one of the trays or inserts of the invention system
Figure 10:
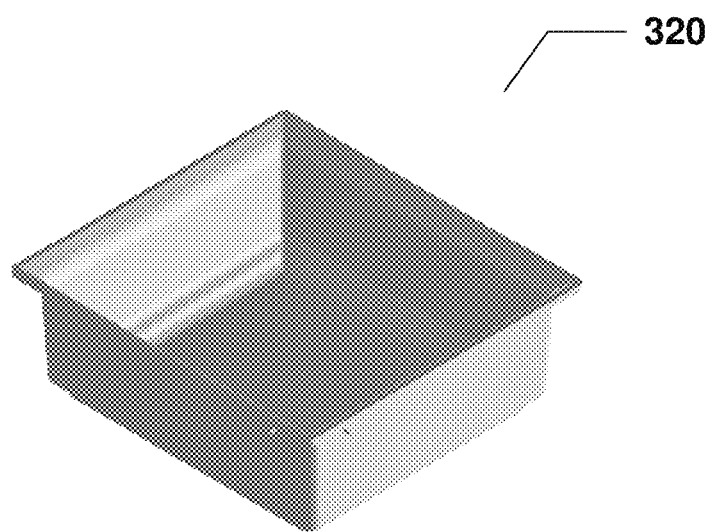
FIG. 10 shows a perspective view of another of the trays or inserts of the invention system

The supporting elements are of two types:
 i) main supporting elements (210), which are placed parallel to each other and to the width of the well (130), their ends sits on the flange (120) of the well (130), as shown in FIG. 2, and have a design illustrated in FIGS. 3 and 4A, and characterized by:
   a. a "U"-channel shaped upper section with a horizontal "floor" (214) and two lateral and vertical walls (212), to receive the edges of the inserts, as shown in FIGS. 9 and 10 under numbers (310) and (320), respectively,
   b. a central section (216), which is a vertical wall, running along the midline of the profile, to provide greater strength and consistency to the element,
   c. a lower section (218), flat, parallel to the "floor" (214) of the upper section, attached to the lower edge of the central section in its entirety, and serving as a support for intermediate supporting elements,
   d. the three sections, upper, central and lower, form a cross section of the body of the main "I"-shaped supporting element (210) forming two "C"-shaped lateral channels next to each other, as illustrated in FIG. 4B, being a cross section of the main supporting element of FIG. 3 through the "A" plane,
   e. the ends of the upper section project beyond the boundary of the central and lower sections to the vertical walls (212) ending in a bevel.
 ii) intermediate supporting elements (220), which are placed transversely between parallel pairs of main supports (210), as illustrated in FIG. 2, whose design, as shown in FIGS. 5 and 6A (an enlarged view of the area bounded by circle "B" of FIG. 5), is characterized by:
   a. an upper section having a U-channel shape similar to that of the main supporting elements (210), with vertical and lateral walls (222) to hold the edge of the inserts,
   b. a central section (226), which is a vertical wall, running along the midline of the profile,
   c. a flat lower section,
   d. the three sections, upper, central and lower, form a longitudinal body of the intermediate supporting element (220) with an "I"-shaped cross section, forming two "C" shaped lateral channels next to each other, as illustrated in FIG. 6B, being a cross section of the intermediate supporting element (220) of FIG. 5 through the "D" plane.

e. the cross section of the intermediate supporting element, FIG. 6B, has the same dimensions as the cross section of the body of the main supporting element, FIG. 4B f. both ends of the intermediate supporting element have a solid projection of square profile (224) whose height corresponds to that of the vertical wall (216) of the main supporting elements (210), and whose depth matches that of the lateral channels of the main supporting elements (210).

Figure 7:
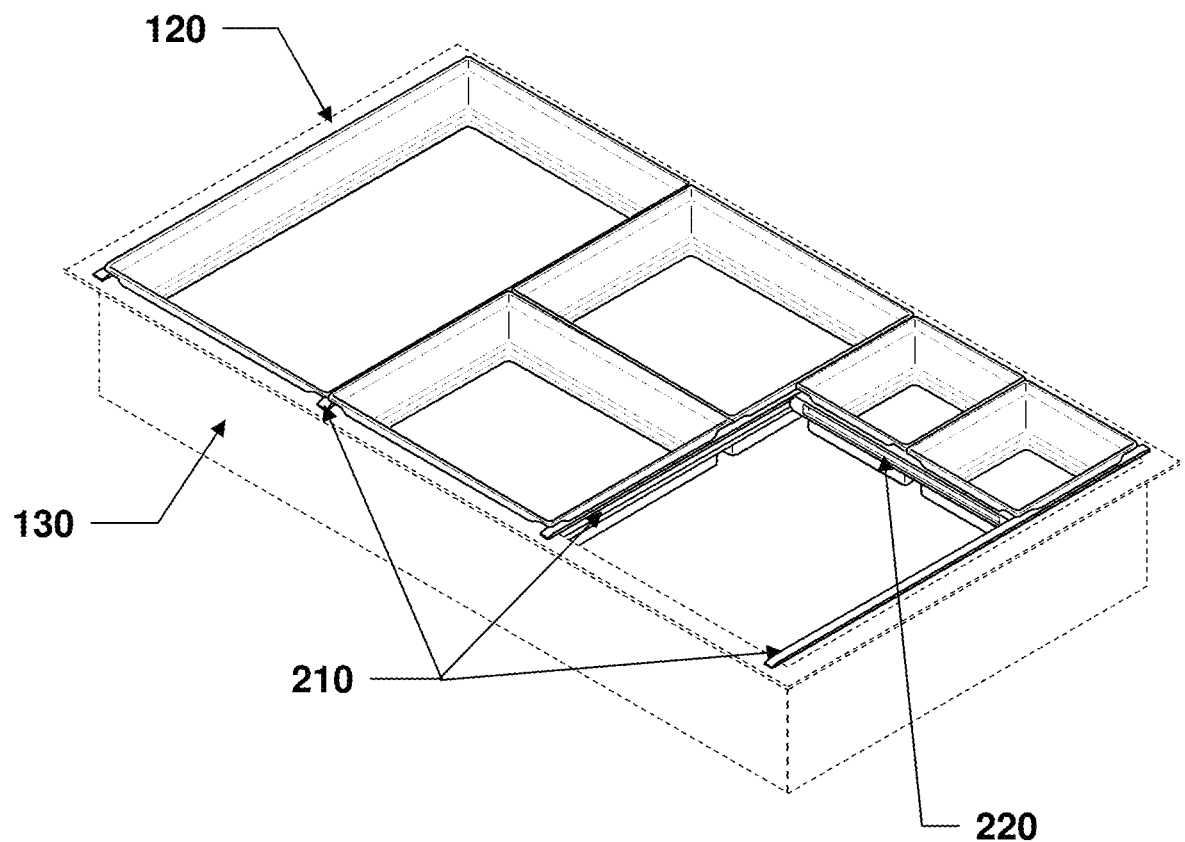
FIG. 7 shows a schematic view of a conventional well, showing the fixed and intermediate supporting elements and inserts of the system of the invention, in their position of use.

As seen in FIG. 7, to install a particular arrangement of inserts in a well (130) of a conventional buffet equipment, the ends of the upper section of the main supporting elements (210), while being used, sit on the upper inner flange (120) of the well (130), where they remain fixed by gravity, in arrangement parallel to each other, along the width of the well (130) along its entire length.

The intermediate supporting elements (220) have the function of being supporting elements for small inserts with different dimensions, forming an arrangement satisfying the client's needs, and they are placed according to the desired configuration, between pairs of main supporting elements (210), which will then be separated by the distance matching the length of the intermediate supporting elements (220) used. The dimensions of the cavity for each insert is determined by the length of two adjacent intermediate supporting elements attached to their corresponding main supporting elements and by the distance between them.

Figure 8A:
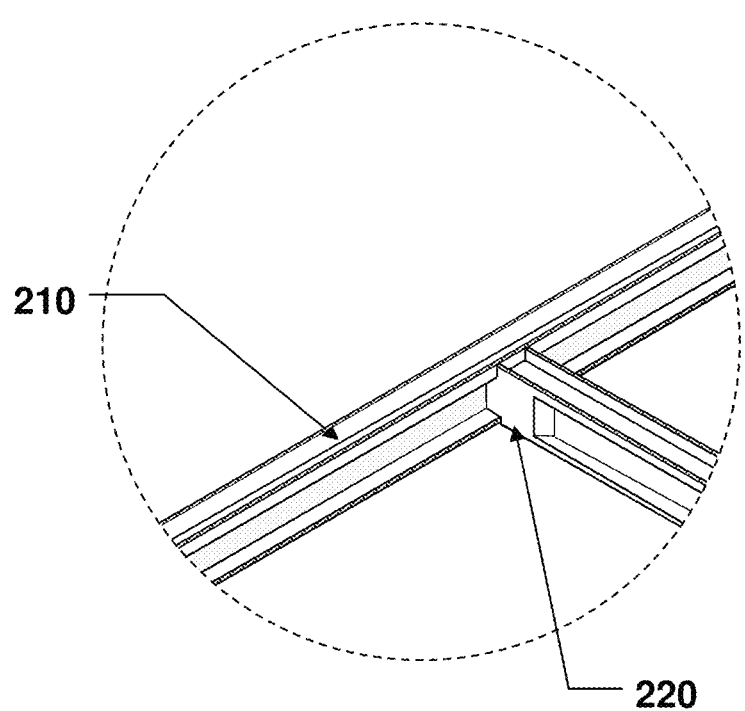
FIG. 8A shows a schematic perspective view of a detail of the crossing between a fixed supporting element and an intermediate supporting element of the invention system.
Figure 8B:
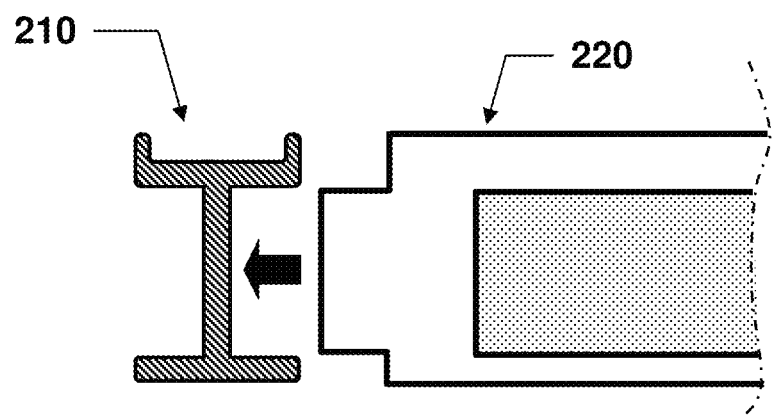
FIG. 8B shows a schematic front plane view of a detail of the crossing between a fixed supporting element and an intermediate supporting element of the invention system

The design of the supporting elements of the invention system is such that the projections of square section (224) at the ends of the intermediate supporting elements (220), accommodate in the "C" shaped lateral channels formed by the lower section (218), the vertical (216) central wall and the floor of the upper section (214) on each side of said main supporting elements (210), as shown in the detail in FIG. 8A and indicated by the arrow in the schematic view of FIG. 8B. The resulting configuration of a tongue-and-groove framework of the main supporting elements (210) and intermediate elements (220) is very stable.

It can be observed that in the same way that an intermediate supporting element (220) is coupled to a main supporting element (210), as described and illustrated in FIGS. 8A and 8B, the coupling of two intermediate supporting elements (220) is possible thereby broadening the possibilities of combining different sizes of inserts in the same configuration.

2. Inserts

In this description "insert" (300) refers to any of the inserts; for example, those indicated under (310), (320) in FIGS. 9 and 10, which will contain the food to be exhibited, and generally shaped like a rectangular prism without cap that can be manufactured in different lengths, widths and heights, to offer different capacities, according to the industry standards and the needs of the end user, which are made with conventional materials.

Figure 11:
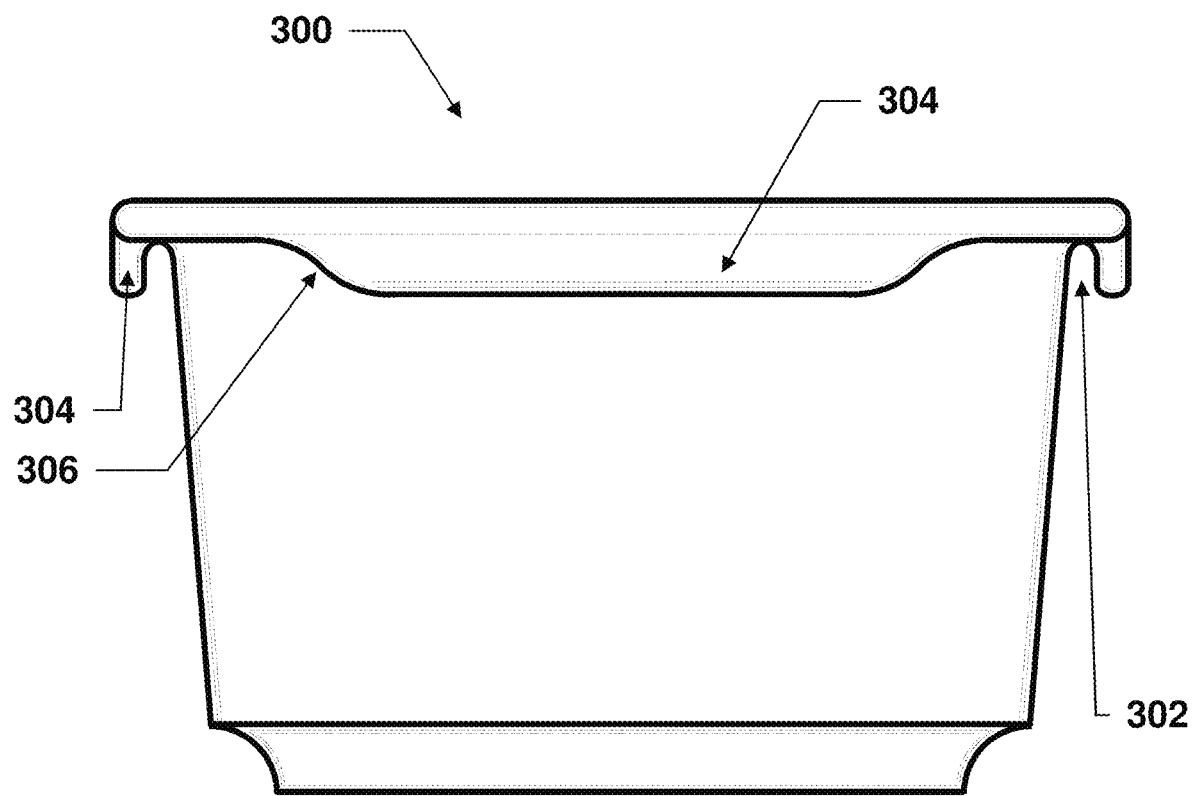
FIG. 11 shows a schematic view of the design of the upper edge at the ends of one of the inserts of the invention system

The inserts (300) of the invention have a novel design of the upper edge, as shown in FIG. 11 for an insert (300) viewed laterally, with a lower perimeter channel (302) formed by the flange (304) in the periphery of the upper end of the insert (300), which allows that said channel (302) to receive the upper edge of the walls (212) or (222) of the main (210) or intermediate (220) supporting elements of the system of support, respectively, as appropriate, and in this way the insert (300) "sits" on said supporting elements while being used.

A special design is observed at the corners of the inserts (300): a "cutting" (306) of the perimeter flange wall (304), which allows the free passage of the upper edges of the walls (212) of the main and intermediate supporting elements (222) of the system of support, which form a corner at a junction, as illustrated in FIG. 8A, preventing said walls from interfering with the fitting of the inserts inside thereby allowing the inserts (300) to completely sit on the upper sections of the main and intermediate supporting elements (222) of the system of support, giving stability to the assembly and preventing the lateral movements of the inserts (300). It should be noted that all exposed edges of the inserts are preferably rounded.

The system of the invention has the flexibility to allow arrangements of inserts of different sizes and depths according to the need of the service, without using a supporting table inside the well and without risk of the inserts sliding on the support profiles and falling inside the well.

Installation

The procedure for installation and use of the system of support and inserts of the present invention is essentially the same as in other conventional systems, as described below:

1) the main supporting elements (210) are distributed parallel to each other, their ends (214) sitting on the upper interior flange (120) of the well (130) of a conventional buffet station (100) available;
2) the solid square-shaped ends (224) of the intermediate supporting elements (220) are coupled to the proximal central walls (216) of two main supporting elements (210), to determine the distance between them and form the space to be occupied by each insert;
3) the inserts are placed in their respective cavities, as illustrated in FIG. 7, taking care of inserting the upper edges of vertical walls of said main supporting elements (212) and intermediate supporting elements (222), in the lower perimeter channel (302) of the respective insert (300).

Figure 12:
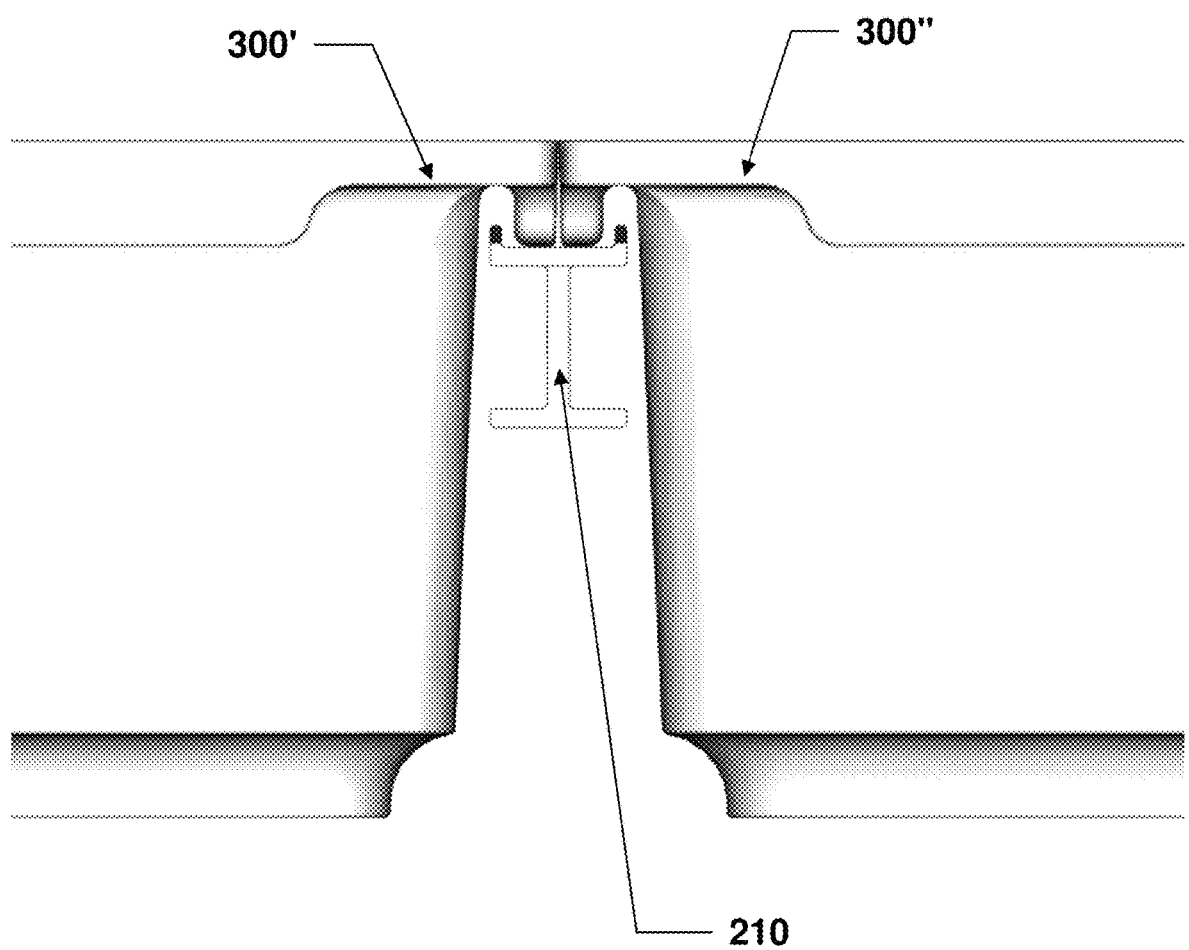
FIG. 12 shows a schematic view of the ends of two adjacent inserts positioned on one of the fixed supporting elements of the invention system.

Note in FIG. 12, the relationship between two adjacent inserts (300') and (300") with a supporting element between them, the inserts (300') and (300") may be equal or different to each other.

From the above description, it seems clear that modifications can be made, and those will be evident to a person knowledgeable about the technical field; however, such modifications resulting from the above statements, should be considered within the scope of protection claimed.

What is claimed is:

1. A system of supports and inserts to be used in a well of an equipment such as a conventional buffet station, which establishes a wide variety of configurations in the same well of a buffet station and confers a high structural stability to each configuration; said system being characterized in that it is formed by main and intermediate supporting elements and food containers called "inserts"; where:

a) the main supporting elements are formed by:

a "U"-channel shaped upper section comprising vertical walls extending upwardly from a lateral floor, the upper section configured to receive edges of the inserts;

ii) a central section comprising a main vertical wall running along a middle line of a profile of the main supporting element; and iii) a flat lower section;

iv) the three sections, upper, middle and lower, form a longitudinal body with an "I" shaped cross section with two "C" shaped lateral channels next to each other;

v) the ends of the upper section project beyond the boundary of the middle and lower sections to the vertical walls of the upper section having beveled ends;

b) the intermediate supporting elements are formed by:
   a "U"-channel shaped longitudinal upper section, similar to that of the main supporting elements and having vertical side walls;
   ii) a central section having a main vertical wall running along a middle line of a profile of the intermediate supporting elements;
   iii) a flat lower section;
   iv) the three sections, upper, central and lower, form a longitudinal body with an "I" shaped cross section with two "C" shaped lateral channels next to each other;
   v) the cross section of the intermediate supporting element has the same dimensions as the cross section of the body of the main supporting element;
   vi) the ends of the intermediate supporting element have a solid projection of square profile whose height corresponds to that of the main vertical wall of the central section of the main supporting elements, and whose depth matches that of the lateral channels of the main supporting elements;

c) the inserts are rectangular prism-shaped without cap, with different capacities for containing food, and they have a perimeter flange at theft upper edge, forming a perimeter channel below said flange, to receive the upper edges of the vertical walls of the respective upper sections of the main and intermediate supporting elements coupled in a particular configuration, to install a specific configuration of inserts in a well of a conventional buffet equipment, each of the projections at the ends of the main supporting elements sits on the perimeter flange of the well, where they are placed parallel to each other along the width of the well;

each of said ends of several intermediate supporting elements is coupled to the "C" shaped lateral channel of two main supporting elements to keep them at a distance and create the spaces to receive the inserts according to a specific configuration, all the supporting elements, both main and intermediate, while being used, are held in place by effect of the male-female relationship existing between the perimeter channel of each insert and the vertical walls of the supporting elements, and by the weight of the inserts.

2. The system of supports and inserts for a conventional buffet station according to claim 1, characterized in that the dimensions of the cavity for each insert are determined by the length of the two adjacent intermediate supporting elements coupled with their corresponding main supporting elements and by the distance between them.

3. The system of supports and inserts for a conventional buffet station according to claim 1, characterized in that the dimensions of the "I" shaped cross sections of both the main and intermediate supporting elements are the same, the coupling of two intermediate supporting elements is possible in order to create cavities of different sizes.

4. The system of supports and inserts for a conventional buffet station according to claim 1, characterized in that the corners of the inserts show a cutting of the perimeter flange wall, to allow the free passage of the upper edges of the vertical walk of the main and intermediate supporting elements, which form a corner at a junction.

* * * * *